Jan. 20, 1942. J. F. KNUTTE 2,270,533
SAFETY BUMPER
Filed March 27, 1939
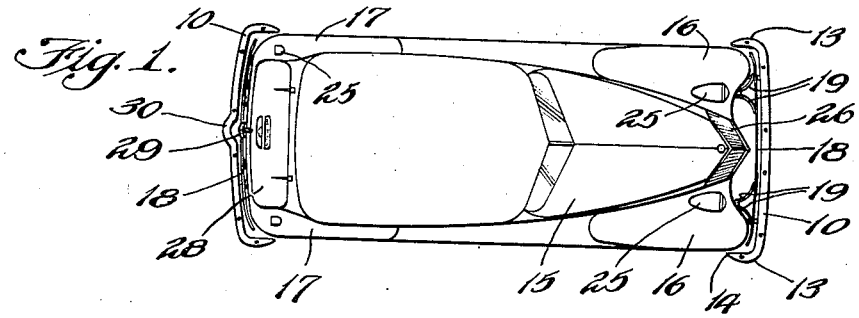
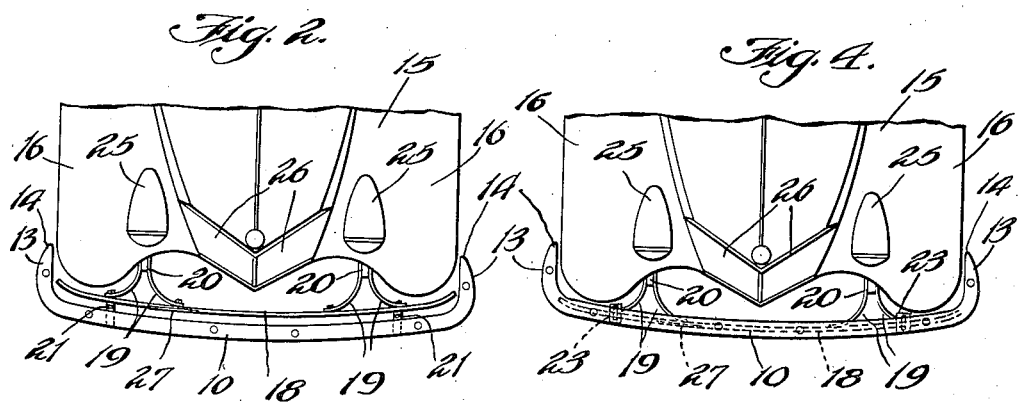
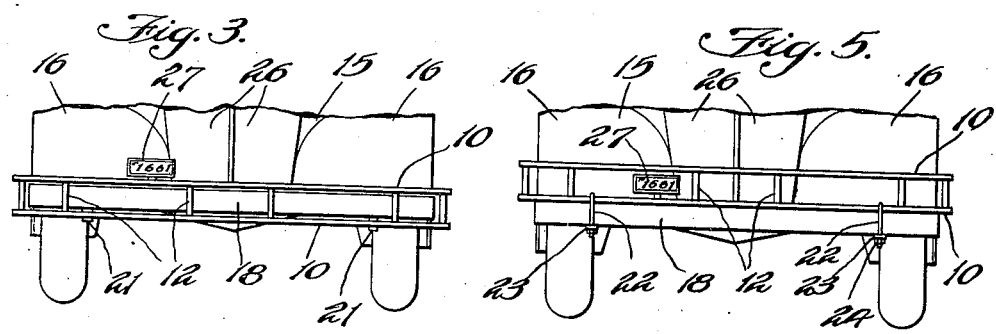
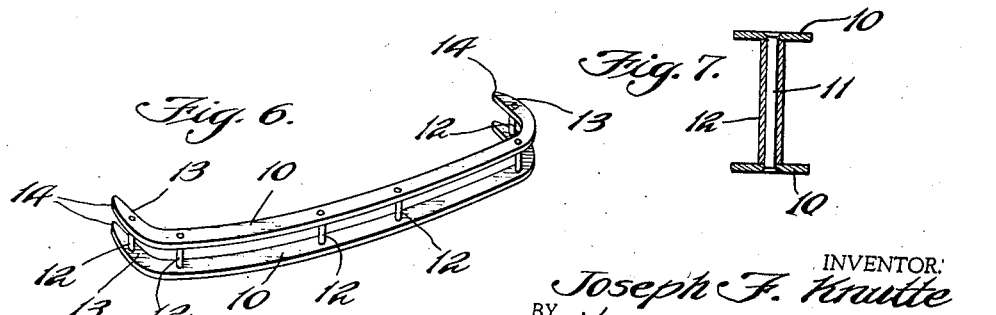
INVENTOR.
Joseph F. Knutte
BY Kent W. Wonnell
ATTORNEY.

Patented Jan. 20, 1942

2,270,533

UNITED STATES PATENT OFFICE 2,270,533

SAFETY BUMPER

Joseph F. Knutte, Chicago, Ill.

Application March 27, 1939, Serial No. 264,349

3 Claims. (Cl. 293—55)

This invention relates in general to an improved protector for a vehicle and is more particularly described as a front and rear guard for the front, rear and side edges of an automobile.

An important object of the invention is in the provision of a strong metallic bumper of improved construction adapted to be used separately or in conjunction with front and rear bumpers already installed and formed to extend at the sides of the front and rear edges of the wheel guards or fenders to protect them at the places where they are most subject to engagement, bumping and distortion.

Further objects of the invention are to provide a protecting bumper having great strength; to provide a strong bumper having a plurality of thin bars spaced apart so that they do not obstruct head or tail lights, license plates, horns, or fog lights, protected thereby; to provide extensions located beyond the sides of the front and rear tips of the side fenders which will prevent the engagement thereof when parking an automobile against a curb; to provide added protection for radiator grills, gas tank filler necks, back compartment doors and locks; to provide an additional vehicle protection which may be installed at a universal heighth, either separately or in conjunction with other bumpers to prevent bumper locking with other similar vehicles; to provide a strong bumper consisting of a number of bars which has a low wind resistance; to provide a safety bumper comprising a plurality of flat plates spaced apart but rigidly connected at various places so that the protecting bumper thus produced may be altered for conforming to the projections and various parts to be protected thereby, to permit the starting crank to be inserted therebetween, and the like; and in general to produce the construction herein shown and described.

In the accompanying drawing illustrating preferred embodiments of the invention;

Fig. 1 is a top view of an automobile showing safety bumpers in accordance with this invention at both ends thereof;

Fig. 2 is a top view of the front only of an automobile showing one method of mounting the front safety bumper;

Fig. 3 is a front view of a portion of the structure shown in Fig. 2;

Fig. 4 is a top view of the front only of an automobile showing another method of mounting the safety bumper;

Fig. 5 is a front view of a portion of the structure shown in Fig. 4;

Fig. 6 is a perspective of a safety bumper in accordance with the invention; and Fig. 7 is a sectional detail of the bumper.

In most of the present types of vehicle bumpers, one or more upright and more or less flat bars are provided beyond the ends of a vehicle for engaging and protecting the vehicle when it engages an obstruction or another car and for warding off a pedestrian if he should happen to be struck. These bumpers are usually spaced from the ends or tips of the fenders which are the most vulnerable points for damage to the vehicle. The extremities of the fenders are left unguarded for engagement with other cars and for engagement with curbs or walls when attempting to park a car along a roadway or to maneuver it into and out of a narrow space between other cars or in a garage.

Another objection to present day bumpers is that they usually have upper and lower projections above the cross bars which are for the purpose of preventing interlocking but are not even effective for that purpose between the projections themselves, and when a pedestrian is struck by a bumper he is usually more injured by these projections than he is by the bumper itself.

The present invention overcomes all of these objections and provides a bumper of a new construction and form in which the protecting bars of the bumper are made of flat stock bent or curved inwardly at the ends, the extremities of the ends projecting inwardly toward the vehicle and laterally beyond the extremities or edges of the proximate fenders, depending upon the end of the vehicle to which they are attached. These bars being disposed flatwise and horizontally are suitably spaced apart to provide extremely strong protectors as they must be bent edgewise instead of flatwise upon impact, the bars being parallel and smoothed both on top and at the bottom will injure a person engaged thereby to the least possible extent, will protect the tips of the fenders against other vehicles and in parking, and also will protect the running boards between the fenders against engagement with a straight curb in parking because the extremities of the bumpers project slightly beyond the fenders at both ends at each side of a vehicle. By providing suitable attaching means a bumper of this kind may be used alone or in conjunction with bumpers already attached to a vehicle, these bumpers may be mounted variably on different vehicles so that they will all be at a universal heighth and thereby prevent interlocking of bumpers, and in addition to the protection afforded for the vehicle itself wind resistance of the bumper is lessened for high speed driving, all of the parts such as the air grills, the lamps, and license plates, are more visible as they are less obstructed by the bars which are arranged flatwise without sacrificing anything of the strength of the bumper.

Referring now more particularly to the drawing, this safety bumper comprises a plurality of flat strips 10 of metal arranged flatwise and spaced apart with connecting and spacing means between them comprising a bolt or bar 11 with a short pipe section 12 surrounding it and disposed between the bars 10, the ends of the bolt 11 being connected by fastening nuts (not shown), by riveting over the ends of the bolt or bar 11, or in any other suitable manner, and thus serving to hold the bumper bars 10 rigidly together but in proper spaced relation throughout their length. The connecting and spacing means are located at different points, depending upon the vehicle to which the safety bumper is attached, so that they will offer the least obstruction to any article, such as a lamp, license tag, or any other part located behind the bumper.

Both extremities 13 of each of the bars 10 are turned in the same direction and the outer edges 14 are beveled, cut away or inclined at the tips to produce a thin practically pointed end which rounds outwardly therefrom.

The length of this bumper is slightly greater than the width of a vehicle 15 to which it is applied so that the bent extremities 13 of the safety bumper are disposed laterally at the edges of the tips of front and rear fenders 16 and 17 so that the fender tips are guarded and protected both from front and side contact, and even when the vehicle is being parked along a curb or is being maneuvered into or out of a garage, or any other narrow space, the extremities of the safety bumper will be engaged rather than the tips of the fender.

It is customary practice to provide an ordinary bumper 18 at the front and rear of a vehicle supported by brackets 19 from ends 20 of the vehicle frame but these bumpers although they are of the width of the vehicle simply project in front of the fenders (or at the rear of the rear fenders) and protect them against front or rear contact, but do not protect the fenders against side contact with the tips or ends of the fenders, which is their most vulnerable point.

In attaching this safety bumper to a vehicle, it may be used separately from or in connection with a bumper already installed upon the car. If used in connection with an ordinary bumper 18 and its supports 20, L-shaped brackets 21 may be attached directly to the bumper 18 or to the brackets 19 by the usual supporting bolts and the height of the safety bumper may be adjusted by varying the length of the arms of the L-bracket 21, one arm of the bracket being attached at the under side to the lower bar 10 of the safety bumper.

If desired the safety bumper may be attached directly to, above or below, a regular bumper 18 as shown in Figs. 4 and 5, in which case one or more U-bolts 22 are hooked over the lower bar of the safety bumper and are connected around the bumper bar 18 by cross plates 23 and bolts 24.

With this construction it is apparent that the thin bars 10 of the safety bumper offer a minimum wind resistance for high-speed movement, they do not obstruct lamps 25, radiator grills 26, license plates 27, or any other parts at the front or rear of the vehicle.

At the rear of some automobiles there is a large door 28 hinged at the top and having a handle or latch 29 at the bottom. This door swings upwardly from the bottom about hinges at the top and the handle or latch may engage the rear safety bumper unless an offset or bulge 30 is provided therein as shown more clearly in Fig. 1. The necessity for this may be overcome by spacing the safety bumper further outwardly from the rear fenders and from the rear bumper bar to which it may be attached.

When this safety bumper is used instead of being attached to the other bumpers as illustrated in Figs. 2 to 5, the wind resistance of the bumpers 18 is obviated.

In practice the bars 10 of which the safety bumper is made are of flat stock substantially uniform in thickness, of two or three inches in width, and approximately one-quarter or three-eighths of an inch in thickness, or more, depending upon the strength desired. By disposing the bars flatwise and with the edges exposed to impact, an extremely strong but light bar is provided.

An advantage of this safety bar is that it can be adjusted and placed at any height so that the heighths of the bumper of all cars may be made the same, no projections or lugs for preventing interlocking of bumpers of adjacent cars will then be necessary, and if a pedestrian is engaged by the bumper he will be thrown aside and not torn or lacerated by the projections of bumpers as now commonly used which are for the purpose of preventing interlocking.

Other changes in the construction, combination and arrangement of the bumper and its parts may be made without departing from the spirit and scope of the invention.

I claim:

1. The combination with a vehicle having wheel fenders with exposed projecting ends, of bumpers at the ends of the vehicle for protecting the ends of the fenders at the ends, and safety bumpers also extending transversely at the end of the vehicle and supplementing the other bumpers, each safety bumper comprising unitary flat cross bars disposed horizontally flatwise, the ends projecting laterally beyond the outer edges of the fenders and then extending inwardly parallel to the side edges of the fenders and overlapping the ends to prevent lateral engagement therewith.

2. The combination with a vehicle having wheel fenders with exposed projecting ends, of bumpers at the ends of the vehicle for protecting the ends of the fenders, safety bumpers also extending entirely across the front and rear of the vehicle, the safety bumper comprising bars disposed horizontally flatwise overlapping the ends of the other bumpers and the extremities extending substantially at right angles at the sides of the adjacent fenders and overlapping the exposed ends thereof at the sides to protect them, and means adjustably securing the safety bumper to the other bumper.

3. Safety bumper structure in accordance with claim 2 in which the first said bumper at the end of the vehicle comprises a substantially flat resilient member disposed vertically on edge and supported from the vehicle near the ends of the bumper, and the safety bumper having unitary flat bars disposed on edge at right angles to the said member both in front and at the right angled portions at the ends.

JOSEPH F. KNUTTE.